Patented Oct. 20, 1931

1,828,699

UNITED STATES PATENT OFFICE

ALBERT C. BURRAGE, JR., OF IPSWICH, MASSACHUSETTS

METHOD FOR THE PREPARATION OF SULPHUR DYES

No Drawing. Application filed January 25, 1927. Serial No. 163,576.

This invention relates to a method for the preparation of sulphur-dyes (more especially dyes of this type which shall be characterized by a ready and complete solubility in water) and to the product resulting therefrom.

It is well known in the art of making dyestuffs that nitro- or amino-aromatic compounds in general (and some other nitrogenous aromatic compounds) are readily reacted upon by an alkali metal sulphide and free sulphur or by the alkali metal poly sulphides to form addition or polymerized compounds, possessing the characteristics of dyestuffs and having a range of colors including blacks, blues, greens, yellows, browns, and so forth. These compounds are generally known as the sulphur dyes.

The application of such sulphur dyes to textiles and like materials has heretofore required the use of an aqueous solution of an alkali or alkali metal sulphide in the dye bath from which they are deposited on the cloth, (either directly or upon drying and oxidizing in the air) to form a relatively fast-colored material.

The use of such strongly alkaline solutions, however, tends to attack the textile fibers and to weaken them more or less, either before or simultaneously with the dyeing reaction, thus leaving the dyed fabric somewhat tender or brittle. Moreover, it is difficult and expensive to prepare such alkali metal sulphide solutions of predetermined composition and in the properly proportioned concentrations and amounts with respect to the dye substance. In fact, it usually requires a preliminary series of tests to establish the most satisfactory conditions, and these conditions may vary with different batches of a single dyestuff. Moreover, it requires constant adjustment and control to maintain the effective relative concentrations constant in a given solution, with respect to either the quantity of dye substance or the alkalinity of the dye bath.

It is accordingly an object of this invention to provide a sulphur dye which is directly soluble in water and a method for preparing the same upon a commercial scale of procedure. It is also an object to increase the efficiency of manufacture and to improve the efficiency of dyeing with the ultimate product obtained. Other objects will appear from the disclosure.

The invention, generally stated, includes the discovery that sulphur dyes (as more specifically defined above) and more particularly sulphur black, as made by the usual processes heretofore known, may be "hydrosoled", so-called, or converted into a water soluble sulphur and/or sulphide addition compound by treating with an alkali metal sulphide, under suitable reaction conditions, such as by heating the reaction mixture or solution (with or without pressure) out of contact with oxidizing gases, (e. g., in vacuum or in an atmosphere of inert gas). The latter condition (of inert gases or vacuum) is preferably continued until the charge has become dry and hard.

As ordinarily obtained, in the usual course of manufacture, and before the original sulphur dye has been thoroughly dried or permitted to harden, it is found desirable if not essential (for the purposes of the present invention) to subject the charge to a relatively thorough washing to remove soluble salts or other impurities which may be formed as contaminant by-products and entrained with the less soluble or insoluble dye substance. This is best done with water and by addition of small amounts. Sometimes the washing may be more readily and completely effected by thoroughly drying the dye substance, pulverizing and then washing. The washed sulphur color is then subjected to the treatment described.

An example of the adaptation of the invention to a specific instance of its practical application in the arts will be described with reference to sulphur black.

A common method for the preparation of sulphur black involves the treatment of a di-substituted phenol compound or of a tri-substituted benzene or like compound typically containing one or more nitrogen atoms in its molecular constitution, with an alkali metal sulphide or polysulphide (under heat and pressure) whereupon an addition or substitution takes place in which the sulphur and possibly also a part of the sodium go into combination with the aromatic nucleus and form sulphur black. This reaction may be accompanied by polymerization also although the precise nature of the chemical reaction or reactions involved is not fully nor certainly understood. Nevertheless, the general course of the reaction is common to reagent compounds of the type described and results in the formation of a compound capable of serving as a dye for textile and like materials under alkaline conditions.

As thus produced, the sulphur color is not soluble in water, nor will it serve for the direct dyeing of textile fibers, but is readily dissolved in an aqueous solution of sodium sulphide, for example, and thereupon becomes capable of dyeing cotton and the like very readily and imparts a fast black thereto.

Such a (black) dye may be prepared from (1-2-4) dinitrochlor benzol by first heating in an aqueous solution with two molecular equivalents of sodium hydroxide and then treating the alkaline reaction product with an alkali metal polysulphide.

The solution is then diluted with water and blown with air. This decomposes the sulphide and the dyestuff is thrown down as a heavy black precipitate. It is then filtered or otherwise separated from the supernatant liquid as well as the soluble reagents or by-products contained therein. It may be further washed with water and then filter pressed or otherwise separated from the washings.

The sulphur black sludge or press cake obtained is now added to an aqueous solution of alkali metal sulphide. This may be the normal sulphide as indicated by the formula $Na_2S$ or it may contain a greater proportion of sulphur ($Na_2S_x$) or a lesser proportion of suluhur ($Na_3S$) as may be desired. For this purpose, the sodium sulphide may be mixed with equal parts of water and heated to 100° C. and the sulphur black added slowly, the temperature being maintained during the addition and for one or two hours thereafter. That a chemical reaction takes place is made manifest by the evolution of heat at this stage of the operation as well as by the new and improved properties of the product obtained.

It is found that the amount of sodium sulphide which can be added to a given quantity of the sulphur black may be controlled in terms of the strength of the dyestuff. Thus, adopting a fixed dye strength for a standard black as 100, (determined by a test of its actual dyeing capacity) a given addition of sulphide (e. g., varying from 35 to 70% of the color substance by weight) may prove to be most satisfactory. If, now, a given sample of dyestuff manifests a dye strength of 90% of the standard the addition of sulphide will be 90% of the 35 to 70 parts. On the other hand, if the strength of the sample is 110%, the addition of sulphide may be 110% of the 35 to 70 parts, with respect to 100 parts by weight of the dye in both cases. As the specific ratio of sulphide to dye substance is increased (e. g., from 35 to 75%), the shade of the ultimate dye tends to vary from reddish black to bluish black to greenish black. respectively The batch is then blown and discharged into pans which are set into a drying oven and heated, as by steam coils, to a temperature of approximately 130° C., while the space above the pans is evacuated and maintained with a vacuum of approximately 26 inches of mercury for eight hours. Alternatively, the atmosphere of the drying chamber may be displaced by an inert, non-oxidizing gas to prevent simultaneous oxidation of the dye substance during the drying operation. In either procedure, that is, either with or without superposed pressure, the drying may be accomplished at relatively low temperatures and thus with a minimized tendency toward the decomposition of the dye substance or compound.

The finished product is usually hard and brittle and may be crushed and ground in any convenient way, the resulting granules or powder being rapidly and completely soluble in water and of substantially uniform composition and color strength. Moreover, it is especially suitable for the direct dyeing of the various textile fibers by dissolving in water and applying the resulting solution directly to the material,—otherwise in accordance with the customary known practices of the art. Moreover, the coloring or dyeing qualities of the color substances are greatly improved and it does not require the addition of alkali or alkali metal sulphide to the dyeing bath (although they may conveniently be used) but forms a dye solution of uniform and readily controlled concentration which is substantially inert with regard to the strength of textile fibers upon which it may be employed. Accordingly, the extra expense of labor and materials in preparing and adjusting the dye bath are eliminated and the concentration of the dye bath is directly determined by the amount of dyestuff which is added thereto. A further economy is realized from the fact that although the total weight of dye substance produced is increased by this addition of alkali metal sulphide and/or sulphur, the dyeing quality or strength per unit of weight of the final product is not proportionately decreased but is, in fact, equal to or greater than that of the untreated sulphur color.

It is further observed, if the procedure is carried out, that with increased proportional amounts of sulphur, (e. g. in excess of that corresponding to the normal sulphide, $Na_2S$) the greater is the amount of sulphide which may be combined with the color substance. Thus, results of the following order have been obtained:—

| Free S added | Increased S in product |
|---|---|
| 0 | Trace. |
| 2.5 | 2.0 |
| 5 | 3 |
| 10 | 5 |
| 15 | 8 |
| 20 | 9 |

Likewise, with increased proportions of sulphide the weight of color substance is increased.

But this increase in the yield of color product is not obtained at the expense of the dyeing or color strength per unit of weight, for the latter may be and usually is greatly improved along with the other advantages and improved factors obtained by the invention.

Ordinary dyeing method: 100 parts sulphur black and 100 parts $Na_2S$ yield 100 dye units.

Present method: 100 parts sulphur black with 50 parts $Na_2S$ yield 150 parts water soluble black dye.

Upon dyeing with the latter as in the ordinary method, using 150 parts $Na_2S$, yields 150 dye units.

That is, 200 parts $Na_2S$ instead of 100 parts of $Na_2S$ produces 50 dye units for the 100 parts of $Na_2S$ additional.

It will be readily appreciated by those skilled in the art of manufacturing and applying dye substances, that various modifications, adaptations and substitutions may be resorted to in the application of the invention in the several arts to which it is related. Such modifications and substitutions are, however, to be understood as comprehended by the above disclosure and included within the terms of the following claims.

I claim:

1. A water soluble black dye characterized by being composed of the reaction product of sulphur black with sulphur and 35% to 70% of alkali metal sulphide, and by being readily and completely soluble in water.

2. A method for the treatment of sulphur black which comprises subjecting the color substance to reaction with 35–70% sodium sulphide and additional quantities of sulphur, and drying the same under inert atmospheric conditions.

3. A method for the treatment of sulphur black which comprises subjecting the color substance to reaction with a predetermined quantity of sodium sulphide in proportions varying from 35% to 70% and additional quantities of sulphur, and drying the same under inert atmospheric conditions, whereby a soluble black is produced of reddish to bluish and greenish shades of black, respectively.

4. A method for the treatment of sulphur black which comprises subjecting the color substance to reaction with 35% to 70% of sodium sulphide and additional quantities of sulphur, and drying the same under vacuum.

5. A method for the treatment of sulphur black which comprises subjecting the color substance to reaction with a predetermined quantity of sodium sulphide in proportions varying from 35% to 70% and additional quantities of sulphur, and drying the same under vacuum, whereby a soluble black is produced of reddish to bluish and greenish shades of black, respectively.

Signed by me at Boston, Massachusetts, this 18th day of January, 1927.

ALBERT C. BURRAGE, Jr.